(12) United States Patent
Kasazumi et al.

(10) Patent No.: US 6,317,546 B1
(45) Date of Patent: Nov. 13, 2001

(54) OPTICAL WAVEGUIDE DEVICE, AND LIGHT SOURCE DEVICE AND OPTICAL APPARATUS INCLUDING THE OPTICAL WAVEGUIDE DEVICE

(75) Inventors: Ken'ichi Kasazumi; Yasuo Kitaoka; Kiminori Mizuuchi; Kazuhisa Yamamoto, all of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/406,953

(22) Filed: Sep. 28, 1999

(30) Foreign Application Priority Data

Sep. 28, 1998 (JP) .................................................. 10-273378

(51) Int. Cl.[7] ................................ G02B 6/00; G02B 6/10; G02F 2/02
(52) U.S. Cl. ........................... 385/122; 359/328; 359/332; 385/129
(58) Field of Search ........................................ 359/328, 332; 385/122, 129, 130, 131, 132

(56) References Cited

U.S. PATENT DOCUMENTS

| | | | |
|---|---|---|---|
| 4,722,081 | 1/1988 | Fujito et al. | 359/132 |
| 5,313,543 | * 5/1994 | Matsuda et al. | 385/122 |

FOREIGN PATENT DOCUMENTS

| | | |
|---|---|---|
| 61-22311 | 1/1986 | (JP) . |
| 61-243414 | 10/1986 | (JP) . |
| 5-323404 | 12/1993 | (JP) . |

* cited by examiner

*Primary Examiner*—Georgia Epps
*Assistant Examiner*—David N. Spector
(74) *Attorney, Agent, or Firm*—Ratner & Prestia

(57) ABSTRACT

An optical waveguide device includes a dielectric substrate; and an optical waveguide formed in the dielectric substrate, the optical waveguide having a longitudinal axis and an outgoing surface disposed at an angle other than a right angle relative to a plane perpendicular to the longitudinal axis.

31 Claims, 11 Drawing Sheets

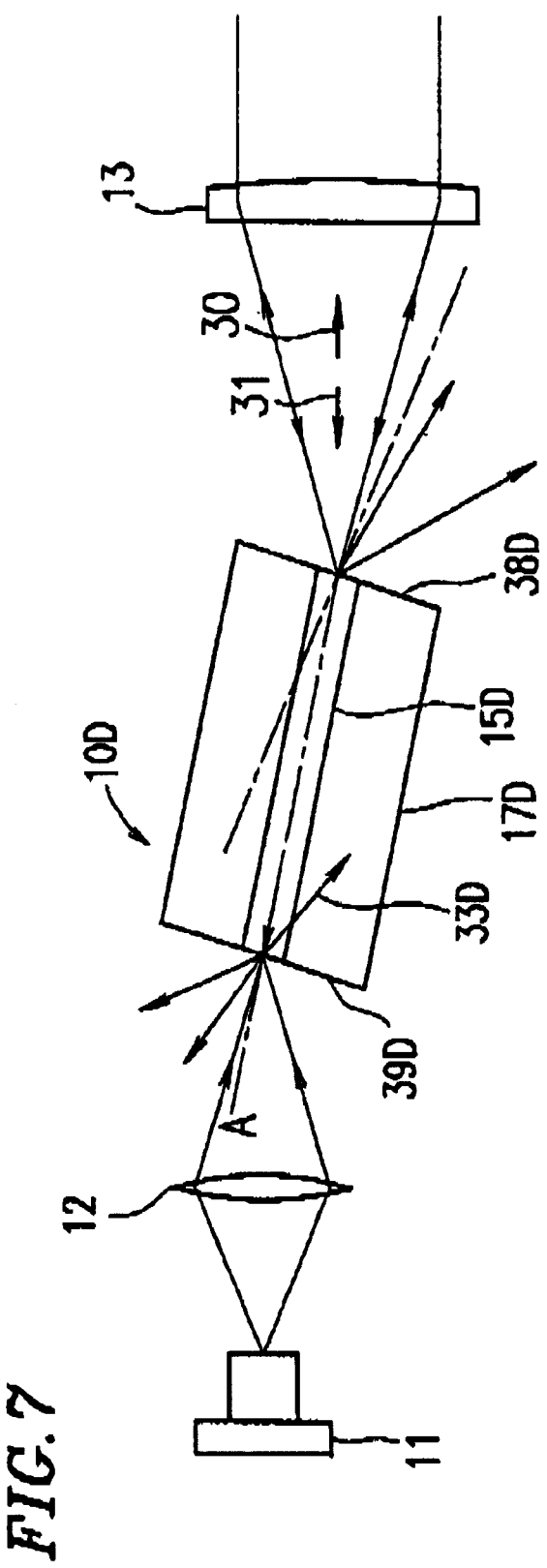

OPTICAL WAVEGUIDE DEVICE, AND LIGHT SOURCE DEVICE AND OPTICAL APPARATUS INCLUDING THE OPTICAL WAVEGUIDE DEVICE

BACKGROUND OF THE INVENTION

1. Field of the Invention

The present invention relates to an optical waveguide device used for optical information processing and optical measurement control performed utilizing a coherent light source, and a light source device and an optical apparatus including the optical waveguide device.

2. Description of the Related Art:

In the fields of optical information recording and reproduction, a higher density of recording and reproduction is realized by using a light source for emitting light having a shorter wavelength. For example, whereas conventional compact disk apparatuses use near infrared light having a wavelength of about 780 nm, digital versatile disk (DVD) apparatuses for recording and reproducing information at a higher density use red semiconductor laser light having a wavelength of about 650 nm. In order to realize a next-generation optical disk apparatus for recording and reproducing information at a still higher density, development of blue laser light source devices have been actively developed. For example, a wavelength conversion element using a non-linear optical substance has been developed to be included in a compact and stable blue laser light source device.

FIG. 14 is a schematic view illustrating an exemplary blue light source device using a second harmonic generation element (hereinafter, referred to as an "SHG element") 117. With reference to FIG. 14, the SHG element 117 will be described.

The SHG element 117 includes a dielectric substrate 114 and a high refractive index area having a width of about 3 $\mu$m and a depth of about 2 $\mu$m formed by a proton exchange method. The high refractive index area acts as an optical waveguide 115. Infrared light emitted from a semiconductor laser 111 having a wavelength of about 850 nm is collected on an incident surface 139 of the SHG element 117 through a collection lens 112 and then propagated through the optical waveguide 115 in the SHG element 117 to form a fundamental guided wave.

Lithium niobate crystals forming the dielectric substrate 114 have a non-linear optical constant. As a result of a sufficiently large non-linear optical constant, a harmonic guided wave having a wavelength of about 425 nm is obtained by wavelength conversion of the infrared light, and excited from the electric field of the fundamental guided wave.

In order to compensate for a propagation constant difference between the fundamental guided wave and the harmonic guided wave, domain inversion areas 116 are periodically formed in the optical waveguide 115. The harmonic guided waves which are excited throughout the optical waveguide 115 are coherently added together and then come out from an outgoing surface 138 of the SHG element 117.

In order to correctly compensate for the propagation constant difference between the fundamental guided wave and the harmonic guided wave, the wavelength of the fundamental guided wave needs to be maintained at a certain value. Accordingly, as the semiconductor laser 111, a DBR laser is used for its very small wavelength fluctuation in accordance with the temperature or the like. A DBR laser has another feature in that since light is oscillated at a single wavelength, the light has a satisfactorily high coherency and a satisfactorily low RIN (relative intensity noise).

FIG. 15 is a schematic view of an optical disk pickup including the SHG element 117 shown in FIG. 14 for providing blue light. With reference to FIG. 15, an operation of the optical disk pickup will be described.

Harmonic blue light output by the SHG element 117 passes through a collimator lens 113, a polarization beam splitter 120, a ¼ wave plate 121 and an objective lens 122 and then is collected to an optical disk 124.

The light modulated by the optical disk 124 is reflected by the polarization beam splitter 120 and guided to a light detector 125 by a collection lens 123. Thus, a reproduction signal is obtained.

The SHG element 117 outputs linearly polarized light in a direction parallel to the page. This light passes through the ¼ wave plate 121 and returns through the ¼ wave plate 121 to become a polarized light which is in a direction perpendicular to the page. Thus, the light reflected by the optical disk 124 is all reflected by the polarization beam splitter 120 and does not return toward the SHG element 117 theoretically.

However, the optical disk 124 includes a material having a birefringence. Accordingly, in actuality, an unnecessary polarized component returns toward the SHG element 117 through the polarization beam splitter 120.

While data stored in the optical disk 124 is reproduced, the objective lens 122 is positionally controlled to focus the light accurately to the optical disk 124. Accordingly, the outgoing surface 138 of the SHG element 117 and the optical disk 124 form a confocal optical system, Thus, the light reflected by the optical disk 124 is accurately collected at the optical waveguide 115 on the outgoing surface 138 of the SHG element 117.

In an optical system including a semiconductor laser as a light source, the light component which returns toward a light source after being reflected induces noise (mode hop noise). Conventionally, various proposals have been made for avoiding the mode hop noise.

For example, oscillation in a plurality of longitudinal modes is caused by modulating light from the semiconductor laser with a harmonic signal or by causing self-oscillation of the semiconductor laser.

In the field of optical communication, for collecting light from a semiconductor laser to an optical fiber, a light isolator utilizing a magneto-optical effect is commonly inserted between the semiconductor laser and the optical fiber.

Japanese Laid-Open Publication No. 5-323404 discloses a method, by which an incident surface of an optical fiber or an optical waveguide is obliquely polished, so that the returning light is obliquely reflected and does not return to the semiconductor laser.

These technologies are for reducing the mode hop noise induced by the light returning to inside the semiconductor laser as a light source.

The present inventors performed experiments on data reproduction by an optical pickup including the SHG element 117 shown in FIG. 15. As a result, the present inventors found a noise which is generated by the following mechanism, which is different from induction by the returning light.

The returning light collected at the optical waveguide 115 on the outgoing surface 138 of the SHG element 117 is reflected by the outgoing surface 138 and interferes with the light coming out from the optical waveguide 115. Thus, an interference noise is generated.

Due to such an interference noise, the optical power output from the SHG element 117 appears to have been changed from the optical disk 124, and thus a reproduction signal from the optical disk 124 is modulated with a low frequency noise, resulting in signal deterioration.

Whereas noise induced by the returning light is generated by the interaction of the light inside the semiconductor laser 111 and the returning light reflected by the incident surface 139 of the SHG element 117, the interference noise is generated by the interference of the light from the SHG element 117 and the returning light reflected by the outgoing surface 138 of the SHG element 117.

The present inventors found another cause of the interference noise as a result of a further research. A portion of the returning light from an external optical system external to the optical waveguide device including, for example, collimator lens 113) is re-excited in the optical waveguide 115 as a guided wave and reflected by the incident surface 139 of the SHG element 117. The light reflected by the incident surface 139 is interfered with the light from the semiconductor laser 111. Such an interference also causes the interference noise.

As described above, an optical system including an optical waveguide device involves two different types of noises One is a low frequency interference noise caused by the Interference, in an external optical system, of (1) light emitted by the light source and propagating through the optical waveguide device toward the external optical system and (2) the light reflected by an outgoing surface or an incident surface of the optical waveguide device after propagating through the optical waveguide device and being reflected by an external object (e.g., the optical disk). The other is the mode hop noise caused inside the semiconductor laser.

Various proposals have been made in order to reduce the mode hop noise, but the interference noise caused in the external optical system has not been a target of attention and no proposals have been made for solving the problem of the Interference noise.

SUMMARY OF THE INVENTION

According to the present Invention, an optical waveguide device includes a dielectric substrate; and an optical waveguide formed in the dielectric substrate, the optical waveguide having a longitudinal axis and an outgoing surface disposed at an angle other than a right angle relative to a plane perpendicular to the longitudinal axis.

In one embodiment of the invention, the dielectric substrate has an outgoing surface disposed in a plane within which the outgoing surface of the optical waveguide is disposed.

In one embodiment of the invention, the outgoing surface is angled so that light going out from the optical waveguide in a first direction and reflected back to the outgoing surface by an external object is directed by the outgoing surface in a second direction different from the first direction.

In one embodiment of the invention, the optical waveguide has an incident surface disposed at an angle other than the right angle relative to the plane perpendicular to the longitudinal axis of the optical waveguide.

In one embodiment of the invention, the dielectric substrate has an incident surface disposed in a plane within which the incident surface of the optical waveguide is disposed.

In one embodiment of the invention, the dielectric substrate has an outgoing surface disposed in a plane within which the outgoing surface of the optical waveguide Is disposed, and the incident surface of the dielectric substrate and the outgoing surface of the dielectric substrate are substantially parallel to each other.

In one embodiment of the invention, the dielectric substrate and the optical waveguide form a second harmonic generation element.

In one embodiment of the invention, the optical waveguide device further includes a reflection reducing layer for reducing a reflection of a harmonic wave.

In one embodiment of the invention, the reflection reducing layer is disposed on an incident surface of the optical waveguide.

In one embodiment of the invention, the optical waveguide device further includes a harmonic wave absorption element for absorbing a harmonic wave in a portion of the optical waveguide in the vicinity of an incident surface of the optical waveguide.

In one embodiment of the invention, the optical waveguide device further includes a grating element having a periodicity of $\Lambda$ in a portion of the optical waveguide in the vicinity of the incident surface. These second harmonic generation element receives light having a wavelength of $\lambda$ as a fundamental wave in a vacuum; and the periodicity $\Lambda$, an effective refractive index n of the optical waveguide, and the wavelength $\lambda$ fulfill the relationship of $\lambda/(4\times n)<\Lambda<\lambda/(2\times n)$.

According to another aspect of the invention, a light source device includes any of the above-described optical waveguide devices and a collimator lens for substantially collimating outgoing light from the optical waveguide. The collimator lens is located at a center of distribution of the outgoing light from the optical waveguide.

According to still another aspect of the invention, an optical apparatus includes any of the above-described optical waveguide devices, and a collection optical system for collecting outgoing light from the optical waveguide on a target of detection. The optical waveguide device and the target of detection are located so as to be confocal with each other.

In one embodiment of the invention, an angle $\theta$ made by a plane perpendicular to the outgoing surface and the optical waveguide, an effective refractive index n of the optical waveguide, and a substantial numerical aperture NA of a portion of the collection optical system which opposes the outgoing surface, fulfill the relationship of $NA\leq\sin(\theta\times n)$.

In one embodiment of the invention, the target of detection includes an optical disk.

According to still another aspect of the invention, an optical waveguide device Includes a dielectric substrate, and an optical waveguide formed in the dielectric substrate. Light going out from the optical waveguide in a first direction and reflected back to the outgoing surface by an external object is directed by the outgoing surface in a second direction different from the first direction.

In one embodiment of the invention, the dielectric substrate and the optical waveguide form a second harmonic generation element.

According to the present invention, a simple structure of an optical waveguide device, in which an outgoing surface is disposed at an angle other than a right angle with respect to a longitudinal axis of an optical waveguide, effectively reduces the Influence of the light returning from an optical system external from the optical waveguide device (e.g., a pickup optical system).

In the embodiment in which the optical waveguide device has both an outgoing surface and an incident surface disposed at an angle other than a right angle with respect to a longitudinal axis of the optical waveguide, the reflection of the light by both surfaces is reduced and thus the influence of the interference of the light returning from the external optical system and the light propagating through and going out from the optical waveguide device is eliminated substantially completely. Since the incident surface is disposed at an angle as described above, the light emitted by a semiconductor laser and reflected by the incident surface Is substantially inhibited toward returning from the semiconductor laser. Thus, the mode hop noise is also reduced as well as the interference noise.

In the embodiment in which the outgoing surface and the incident surface are parallel to each other, the optical waveguide devices are easy to produce.

Also according to the present invention, a light source device including the above-described optical waveguide device and an optical apparatus including such a light source are provided. A collimator lens in the light source device is located at the center of distribution of outgoing light from an optical waveguide of the optical waveguide device. Therefore, the light returning toward the light source device from the external optical system is reduced.

Due to the outgoing surface disposed at an angle as described above, light returning from an external optical system and reflected by the outgoing surface is prevented from interfering with the outgoing light from the optical waveguide. Therefore, a stable light source device with substantially no interference noise is provided.

In the embodiment in which an incident surface is disposed at an angle with respect to a longitudinal axis of the optical waveguide as well as the outgoing surface, the light returning from the external optical system is prevented from being reflected by the incident surface. Thus, the interference noise is further reduced. Furthermore, the light from a light source is prevented from returning toward the light source as a result of being reflected by the incident surface. Thus, the hop mode noise is also reduced.

Thus, the invention described herein makes possible the advantages of providing (1) an optical waveguide device for reducing an interference noise in an optical apparatus, and (2) a light source device and an optical apparatus including such an optical waveguide device.

These and other advantages of the present invention will become apparent to those skilled in the art upon reading and understanding the following detailed description with reference to the accompanying figures.

BRIEF DESCRIPTION OF THE DRAWINGS

FIG. 7 is a schematic top view of a light source device in still another example according to the present invention;

DESCRIPTION OF THE PREFERRED EMBODIMENTS

Hereinafter, the present invention will be described by way of illustrative examples with reference to the accompanying drawings.

In this specification, the term "outgoing surface" refers to a surface of the dielectric substrate and the optical waveguide from which the light goes out unless otherwise described. Thus, the dielectric substrate may itself have an outgoing surface different from that of the optical waveguide, or the dielectric substrate and the optical waveguide may have an outgoing surface In the same plane. The term "incident surface" refers to a surface of the dielectric substrate and the optical waveguide on which light is incident from a light source unless otherwise described. Thus, the dielectric substrate may itself have an incident surface different from that of the optical waveguide, or the dielectric substrate and the optical waveguide may have an incident surface in the same plane. The term "outgoing light" refers to the light going out from the optical waveguide.

Example 1

Figure 1:
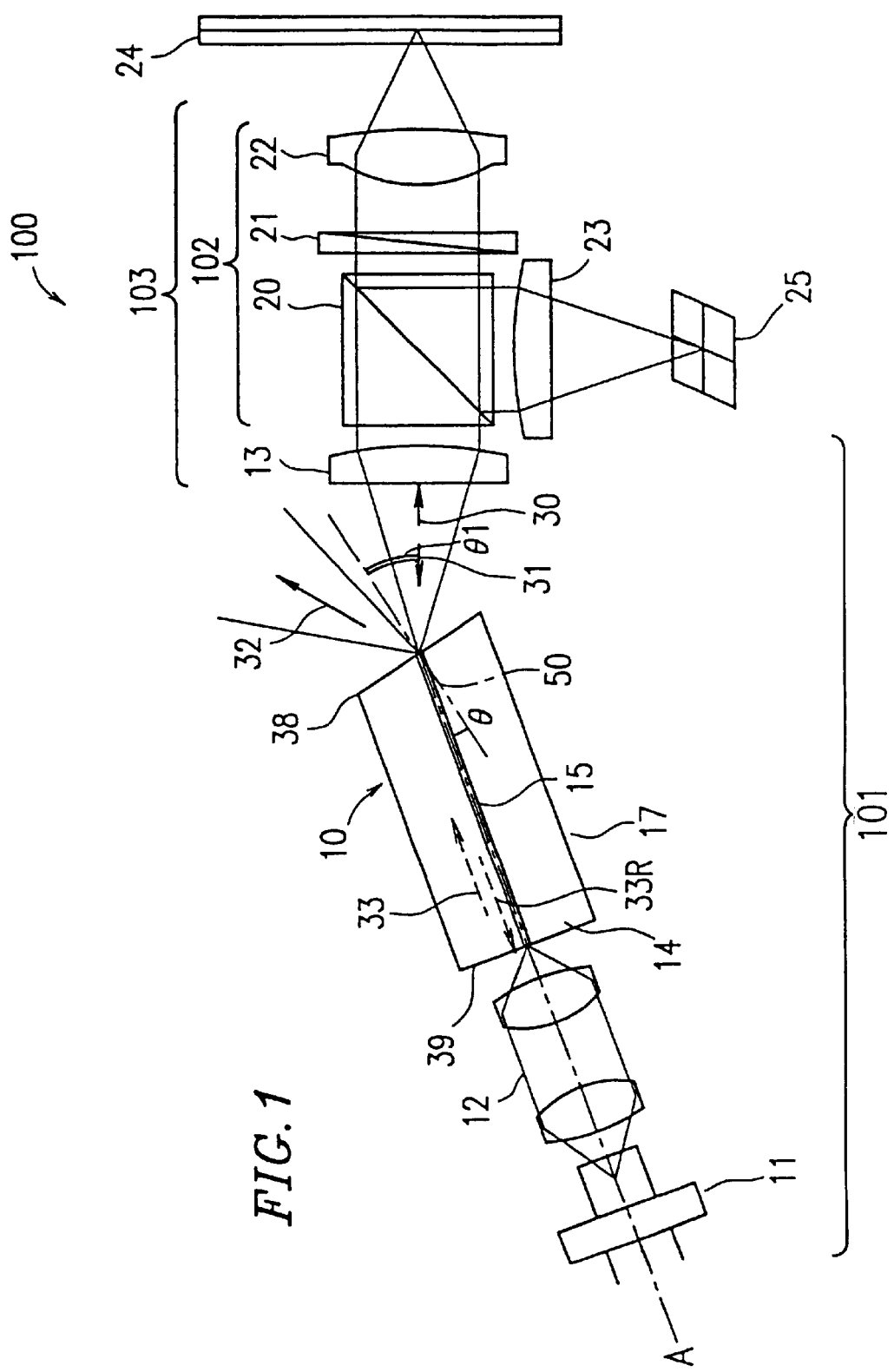
FIG. 1 is a schematic top view of an optical apparatus including a light source device which includes an optical waveguide device in an example according to the present invention.

FIG. 1 shows a schematic view illustrating an exemplary structure of an optical apparatus 100 including an optical waveguide device 10 in a first example according to the present invention. The optical apparatus 100 is, for example, an optical pickup for detecting data stored in an optical disk 24.

The optical apparatus 100 includes a light source device 101 and a collection optical system 102. The light source device 101 includes, for example, a semiconductor laser 11 as a light source, a collection lens 12, the optical waveguide device 10, and a collimator lens 13. The collection optical system 102 includes, for example, a polarization beam splitter 20, a ¼ wave plate 21 and an objective lens 22. The optical waveguide device 10 includes a dielectric substrate 14 and an optical waveguide 15 formed therein. In the following examples, an SHG element includes the dielectric substrate 14 and the optical waveguide 15. According to the present invention, other types of elements may be used as a dielectric substrate and an optical waveguide.

The optical apparatus 100 operates in, for example, is the following manner.

Light having a wavelength of about 850 nm is emitted by the semiconductor laser 11. While the light is propagated through the optical waveguide 15, the light is converted to blue light having a wavelength which is about half of that of the infrared light emitted by the semiconductor laser 11. The blue light goes out from an outgoing surface 38 of an SHG element 17.

The light from the SHG element 17 passes through a collimator lens 13 and the polarization beam splitter 20 and then is collected to the optical disk 24 by the objective lens 22.

The light reflected by the optical disk 24 is reflected by the polarization beam splitter 20 and thus is guided to a light detector 25 through a collection lens 23. When the optical disk 24 includes a material having birefringence, an unnecessary polarized light component passes through the polarization beam splitter 20 and thus returns to the SHG element 17.

Since the objective lens 22 is positionally controlled to focus light accurately to the optical disk 24, the outgoing surface 38 and the optical disk 24 form a confocal optical system. Accordingly, returning light 31 returning from a pickup optical system 103 is collected on the outgoing surface 38. The pickup optical system 103 includes the collimator lens 13, the polarization beam splitter 20, and the objective lens 22.

The outgoing surface 38 shown in FIG. 1 is disposed so that a plane 50 perpendicular thereto has an angle of $\theta$ with respect to a longitudinal axis A of the optical waveguide 15. In other words, the outgoing surface 36 has an angle of $\theta$ relative to a plane perpendicular to the longitudinal axis A of the optical waveguide 15. In this specification, such a positional relationship between the outgoing surface and the optical waveguide may also be represented as being oblique with respect to the optical waveguide.

Outgoing light 30 from the optical waveguide 15 goes out at an angle of $\theta 1$ with respect to the plane 50 perpendicular to the outgoing surface 38. The angle $\theta 1$ is represented by expression (1) by Snell's law of refraction.

$$\theta 1 = n \times \sin \theta \quad (1)$$

As can be appreciated from expression (1), the angle $\theta 1$ is defined by the refractive index n of the optical waveguide 15 and the angle $\theta$ made by the optical waveguide 15 and the plane 50.

Since the light from the optical waveguide 15 goes out with an angle other than a right angle with respect to the optical waveguide 15, the pickup optical system 103 is located at an angle other than a right angle with respect to the optical waveguide 15 as shown in FIG. 1. Due to such a structure, a reflected light component 32 of the returning light 31 which is reflected by the outgoing surface 38 is offset relative to the outgoing light 30 by 2×$\theta 1$. As a result, the reflected light component 32 is not directed to the collimator lens 13 and thus is not interfered with the outgoing light 30.

As shown in FIG. 1, the collimator lens 13 is located at an angle other than a right angle relative to the optical waveguide 15. More specifically, the collimator lens 13 is located at the center of distribution of the outgoing light 30 which goes out at the angle defined by the Snell's law of refraction.

Due to such a structure, the angle made by the returning light 31 and the reflected light component 32 is larger than that In a structure where the collimator lens 13 is located at a right angle with respect to the optical waveguide 15. Accordingly, the outgoing light 30 is utilized most efficiently.

The angle $\theta$ made by the optical waveguide 15 and the plane 50 does not need to be limited to any specific angle for reducing an Interference noise so long as it is not a right angle. In the case where the angle $\theta 1$ of the outgoing light 30 with respect to the plane 50 and a numerical aperture (NA) of a portion of the pickup optical system 103 (the portion opposing the outgoing surface 38) fulfill the conditions represented by expression (2), the outgoing light 30 and the reflected light component 32 are substantially completely separated from each other, so that the interference of the outgoing light 30 and the reflected light component 32 is substantially completely eliminated. The above-mentioned numerical aperture is also obtained at a portion of the collection optical system 102 (the portion opposing the outgoing surface 38).

$$NA < \sin(\theta \times n) \quad (2)$$

The numerical aperture of the above-mentioned portion of the pickup optical system 103 does not simply refer to a numerical aperture of the collimator lens 13. For example, in the pickup optical system 103 shown in FIG. 1, the collimator lens 13 has a larger effective radius than that of the objective lens 22, and the effective beam radius of the pickup optical system 103 is defined by the effective radius of the objective lens 22.

In this example, the numerical aperture for substantially completely eliminating the influence of the reflected light component 32 is also represented by expression (3):

$$NA = \sin(r/f) \quad (3)$$

where r is the effective beam radius of the pickup optical system 103, i.a., the effective radius of the objective lens 22, and f is the focal length of the collimator lens 13. The angle $\theta$ made by the optical waveguide 15 and the plane 50 is set to be in a range which fulfills expressions (2) and (3).

In the case where the optical apparatus 100 is used for a DVD reproduction apparatus or CD reproduction apparatus, the effective beam radius r is about 2 mm and the focal length f of the collimator lens 13 is about 15 mm. When the optical waveguide device 10 having the optical waveguide 15 is formed of lithium niobate and has a refractive index of 2.2, the angle $\theta$ made by the optical waveguide 15 and the plane 50 is preferably set to be 3.5 degrees or more. The upper limit of the angle $\theta$ is determined by a critical angle of total internal reflection. However, since the dependency of the transmittance of the outgoing surface 38 on the angle $\theta$ increases as the angle $\theta$ increases, it is practically preferable to set the angle $\theta$ at about 20 degrees or less.

Figure 2:
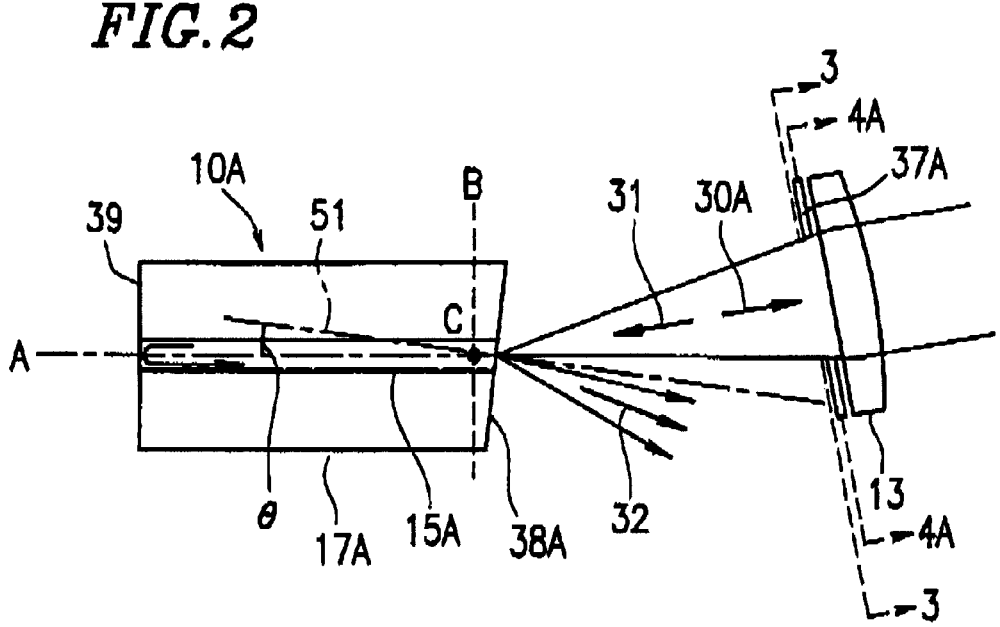
FIG. 2 is a partial schematic top view of a light source device in another example according to the present invention.

FIG. 2 shows another optical waveguide device 10A usable in the optical apparatus 100 (FIG. 1). The optical waveguide device 10A includes an SHG element 17A. The SHG element 17A includes a proton exchange optical waveguide 15A. A plane 51 perpendicular to an outgoing surface 38A of the SHG element 17A has a smaller angle with respect to a longitudinal axis A of the optical waveguide 15A as compared to the outgoing surface 38 in FIG. 1.

Figure 3:
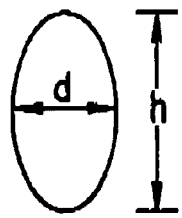
FIG. 3 is a cross-sectional view of a far-field image of light from the light source device shown in FIG. 2.

When the optical waveguide device 10A has the proton exchange optical waveguide device 15A as shown in FIG. 2, a far-field image of outgoing light 30A from the optical waveguide 15A often has an elliptical shape as shown in FIG. 3. FIG. 3 is a cross-sectional view of the outgoing light 30A in FIG. 2 taken along line 3—3 of FIG. 2. As shown in FIG. 3, the height h of the far-field image is greater than the width d thereof.

Figure 4A:
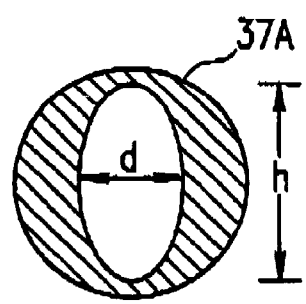
FIGS. 4A, 4B and 4C each show examples of different apertures which can be provided in the light source device shown in FIG. 2.

In this case, as shown in FIG. 2, an aperture plate 37A having an aperture matching the far-field image of the outgoing light 30A shown in FIG. 3 can be provided between the collimator lens 13 and the optical waveguide device 10A but in the vicinity of the collimator lens 13. FIG. 4A is a cross-sectional view of the aperture plate 37A shown in FIG. 2 taken along line 4A—4A of FIG. 2. As shown in FIG. 4A, the height h of the aperture of the aperture plate 37A is greater than the width d thereof, which matches the far-field image of the outgoing light 30A shown in FIG. 3. By providing the aperture plate 37A, the numerical aperture of a portion of the pickup optical system (the portion opposing the outgoing surface 38A) in the direction of width d (FIG. 3) can be reduced without losing a significant amount of light. (Only the collimator lens 13 of the pickup optical system is shown in FIG. 2.) In the structure shown in FIG. 2, the angle θ for substantially eliminating the interference of the reflected light component 32 needs to fulfill expressions (2) and (4):

$$NA = \sin\{(d/2)/f\} \tag{4}$$

where d is the width of the aperture of the aperture plate 37A. Accordingly, the angle θ can be decreased as compared to that in the structure shown in FIG. 1.

A far-field image of light going out from a representative proton exchange optical waveguide extends in the direction of height h (FIG. 3) twice as large as in the direction of the width d. Accordingly, the angle θ made by the plane 51 (FIG. 2) and the optical waveguide 15A can be reduced to about half of the angle θ in FIG. 1. When the optical waveguide device 10A is combined with the pickup optical system 103 shown in FIG. 1, the angle θ is 1.8 degrees or more. In actuality, the angle θ is reasonably set to be 2 degrees or more in consideration of positional errors of the lens, the light source and the like. The upper limit of angle θ is appropriately set to be about 20 degrees.

In the example shown in FIG. 2, the far-field image of the outgoing light 30A is larger in the direction of the height h (FIG. 3) than in the direction of the width d. In the case where a far-field image of the light is larger in the direction of the width d than in the direction of the height h due to, for example, a structure of the optical waveguide, an aperture plate having an aperture which is larger in the direction of the width d than in the direction of the height h can be provided.

Figure 4B:
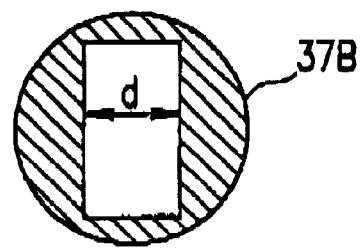
Figure 4C:
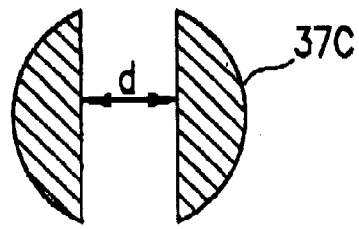

The aperture of the aperture plate to be provided is not limited to have an elliptical shape but can be rectangular (37B) as shown in FIG. 4B or strip-like (37C) as shown in FIG. 4C. The same effect is obtained as long as the aperture is sized differently in the direction of the width d from in the direction of the height h.

A technology for forming the outgoing surface of the optical waveguide device to be oblique with respect to the optical waveguide is disclosed in, for example, Japanese Laid-Open Publication No. 61-22311, The technology disclosed in this publication, by which an end surface of an optical fiber is oblique, provides an effect of preventing reflection of the guided wave by the end surface. According to the present Invention, the optical waveguide device has an oblique outgoing surface for reflecting the light returning from the pickup optical system to be directed to a different direction from the light going out from the optical waveguide device. Therefore, the light returning from an external object and reflected by the outgoing surface is not interfered with the outgoing light from the optical waveguide. The present invention Is different from the above-mentioned technology for preventing the reflection of the guided wave in both the structure and the effect.

In FIG. 2, a top view of the optical waveguide device 10A is shown. An axis A extends through the optical waveguide 15A, and a plane B is perpendicular to the longitudinal axis A. The outgoing surface 38A is disposed at a non-parallel angle relative to the plane B and about an axis C extending into the page and perpendicular to the longitudinal axis A. The outgoing surface 38 shown in FIG. 1 is also disposed in the same manner.

Figure 5:
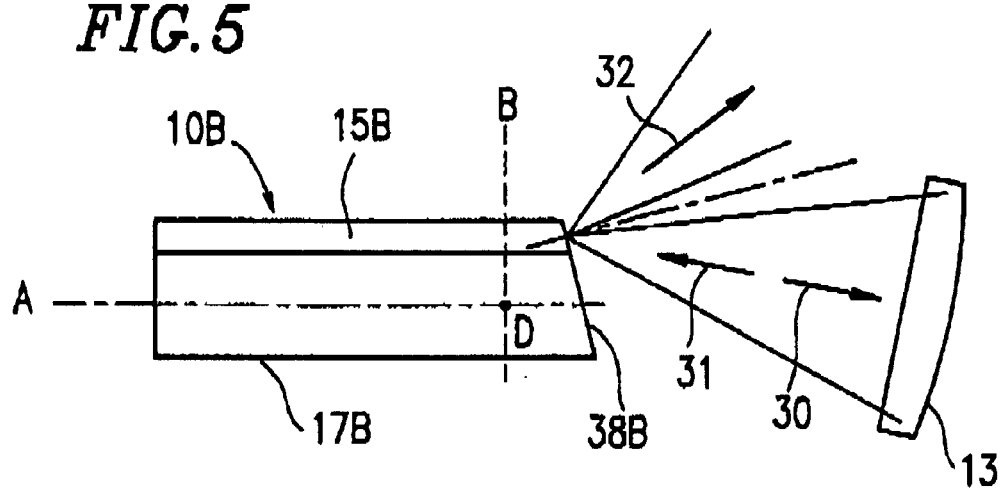
FIG. 5 is a partial schematic side elevational view of a light source device in still another example according to the present invention.

FIG. 5 shows a side elevational view of an optical waveguide device 10B including an SHG element 17B having an outgoing surface 38B which is disposed in a different direction. The outgoing surface 38B is disposed at a non-parallel angle relative to the plane B and about an axis D extending into the page and perpendicular to the longitudinal axis A. The optical waveguide device 10B having such an outgoing surface 38B also avoids the interference of the outgoing light 30 and the reflected light component 32.

Figure 6:
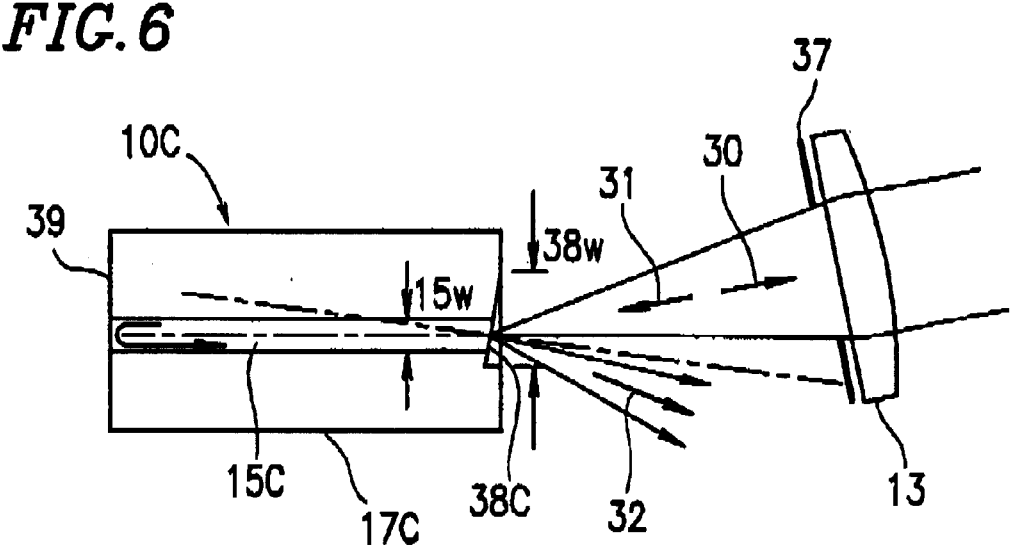
FIG. 6 is a partial schematic top view of a light source device in still another example according to the present invention.

In the examples shown in FIGS. 1, 2 and 5, the entirety of the outgoing surface of the SHG element is disposed at an angle other than a right angle relative to a plane perpendicular to a longitudinal axis of the optical waveguide. Such an outgoing surface is easily formed by polishing the entire outgoing surface obliquely. FIG. 6 shows an optical waveguide device 10C having an alternative outgoing surface 38C. The outgoing surface 38C of an SHG element 17C of the optical waveguide device 10C is disposed at an angle other than a right angle relative to a plane perpendicular to a longitudinal axis of an optical waveguide 15C only at a portion corresponding to an end of the optical waveguide 15C. The optical waveguide device 10C having such an outgoing surface 38C provides similar effects as those provided by the optical waveguide devices 10, 10A and 10B.

The outgoing surface 38C is formed by, for example, a dicing method. For example, use of a blade having a surface roughness of #6000 realizes an outgoing surface which almost appears to be obtained by optical polishing. The outgoing surface 38C is obtained by making a cut-out portion having a width 38w which is equal to or greater than a width 15w of the optical waveguide 15C, for example, 10 μm in a flat outgoing surface of the optical waveguide device 10C. Since dicing is performed to merely about 10 μm, the surface can easily be mirror-processed, and the blade is not significantly worn out. Thus, the processing yield is satisfactorily high.

In the first example, optical waveguide devices each having an outgoing surface which is disposed at an angle other than a right angle relative to a plane perpendicular to a longitudinal axis of the optical waveguide are described. Such a structure reduces the interference noise caused by the influence of the outgoing light from the optical waveguide and the light returning from the pickup optical system and reflected by the outgoing surface. Although such a structure is sufficient to reduce the interference noise, a reflection by an incident surface of the optical waveguide device needs to be considered in order to more completely reduce the interference noise.

As indicated by dashed line 33R in FIG. 1, the returning light 31 from the pickup optical system 103 is partially incident on the optical waveguide 15 and reflected by an incident surface 39 of the SHG element 17 to be a reflected waveguide component 33. The reflected waveguide component 33 goes out from the outgoing surface 38. The reflected waveguide component 33 cannot be removed by forming the outgoing surface 38 obliquely with respect to the optical waveguide 15 and causes noise as a result of interfering with the outgoing light 30.

Example 2

In a second example according to the present invention, an exemplary optical waveguide device 10D shown in FIG. 7 for preventing or substantially inhibiting the reflection by an incident surface 39D of an SHG element 17D of the optical waveguide device 10D will be described. The incident surface 39D is disposed at an angle other than a right angle with respect to a plane perpendicular to a longitudinal axis of an optical waveguide 15D as well as an outgoing surface 38D of the SHG element 17D. In this specification, such a positional relationship between the incident surface and the optical waveguide may also be represented as being oblique with respect to the optical waveguide.

Although not shown in the drawings, the incident surface 39D can be disposed at an angle other than a right angle relative to a plane perpendicular to the longitudinal axis A of the optical waveguide 15D only at a portion corresponding to an end of the optical waveguide 15D, such as was described, for example, with respect to the outgoing surface of the example of FIG. 6. Such a structure provides similar effects as those provided by the optical waveguide device 10D.

Returning light 31 from the pickup optical system (only the collimator lens 13 is shown in FIG. 7) is incident on the optical waveguide 15D and reflected by the incident surface 39D to be a reflected waveguide component 33D. The reflected waveguide component 33D is not incident on the optical waveguide 15D and is directed to the inside of the optical waveguide device 10D while being scattered. Thus, the reflected waveguide component 33D does not reach the outgoing surface 38D.

In such a structure, the reflection by both the incident surface 39D and the outgoing surface 38D is reduced, and thus the influence of the interference of the returning light 31 and the outgoing light 30 is substantially completely eliminated.

Since the Incident surface 39D is oblique with respect to the optical waveguide 15D, light returning to the semiconductor laser 11 as a result of being reflected by the incident surface 39D is also suppressed. Thus, the mode hop noise caused by the semiconductor laser 11 is also reduced.

Example 3

Waveguide devices having both an incident surface and an outgoing surface formed obliquely with respect to an optical waveguide can be produced without lowering the productivity in the case where the incident surface and the outgoing surface are parallel to each other.

Waveguide devices are usually produced as follows. A number of optical waveguide devices are formed on a large-area dielectric substrate and cut into individual optical waveguide devices. End surfaces of the individual optical waveguide devices are then smoothed by polishing.

Figure 8A:
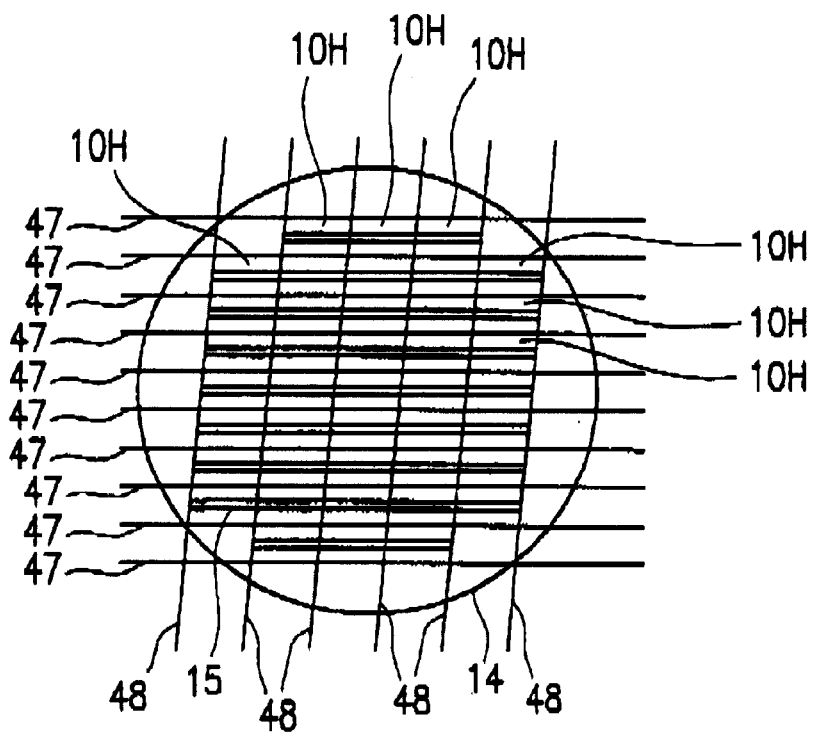
FIGS. 8A and 8B each show an exemplary arrangement of a plurality of optical waveguide devices during production.

FIG. 8A shows an exemplary arrangement of a plurality of the optical waveguide devices 10H on a dielectric substrate 14.

The optical waveguide devices 10H having an outgoing surface and an incident surface parallel to each other can be arranged at a high density with no wasted space. Furthermore, each of lines of optical waveguide devices 10H can be cut off in one procedure and end surfaces thereof can be polished in one procedure. Specifically, each line of optical waveguide devices 10H is cut off along a line 48 (the vertical line shown in FIG. 8A), and end surfaces of the optical waveguide devices 10H are polished in one procedure. Then, each line of optical waveguide devices 10H is cut into individual optical waveguide devices 10H along a line 47 (the horizontal line shown in FIG. 8A). In this manner, polishing of end surfaces, which is relatively time-consuming, does not need to be repeated for each optical waveguide device 10H.

Figure 8B:
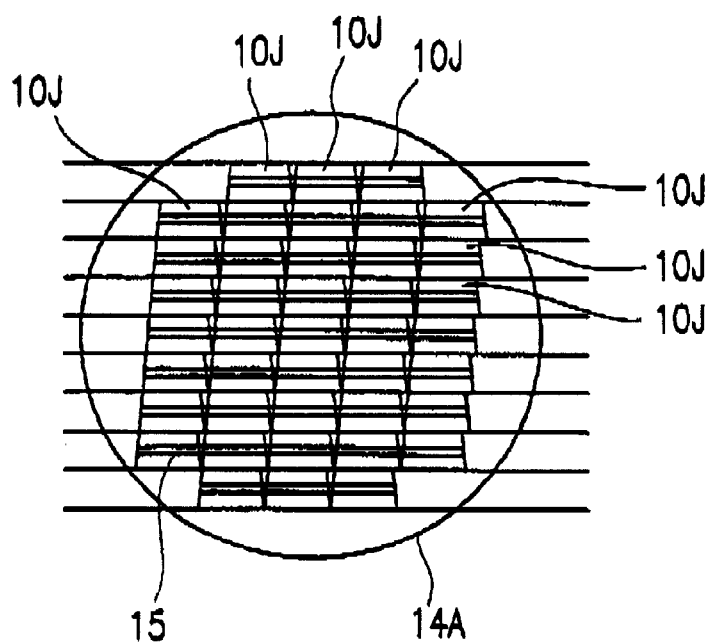

FIG. 8B shows an exemplary arrangement of optical waveguide devices 10J on the dielectric substrate 14A. The optical waveguide devices 10J have an incident surface and an outgoing surface which are not parallel to each other. As can be appreciated from FIG. 8B, each line of optical waveguide devices 10J cannot be cut off along one line. Accordingly, end surfaces of each line of optical waveguide devices 10J cannot be polished in one procedure. This requires the end surfaces of the optical waveguide devices 10J to be polished individually, which significantly lowers the productivity as compared to optical waveguide devices having an incident surface and an outgoing surface formed at a right angle with respect to the optical waveguide.

Such a problem is avoided by forming the incident surface and the outgoing surface parallel to each other.

In fourth through sixth examples according to the present invention, other structures of optical waveguide devices will be described with reference to FIGS. 9 through 11. The structures in the fourth through the sixth examples are specifically effective when a second harmonic generation (SHG) element is used in the optical waveguide device, a fundamental wave having a relatively long wavelength is incident on an incident surface of an optical waveguide of the optical waveguide device and a harmonic wave having a shorter wavelength goes out from an outgoing surface of the optical waveguide.

Example 4

Figure 9:
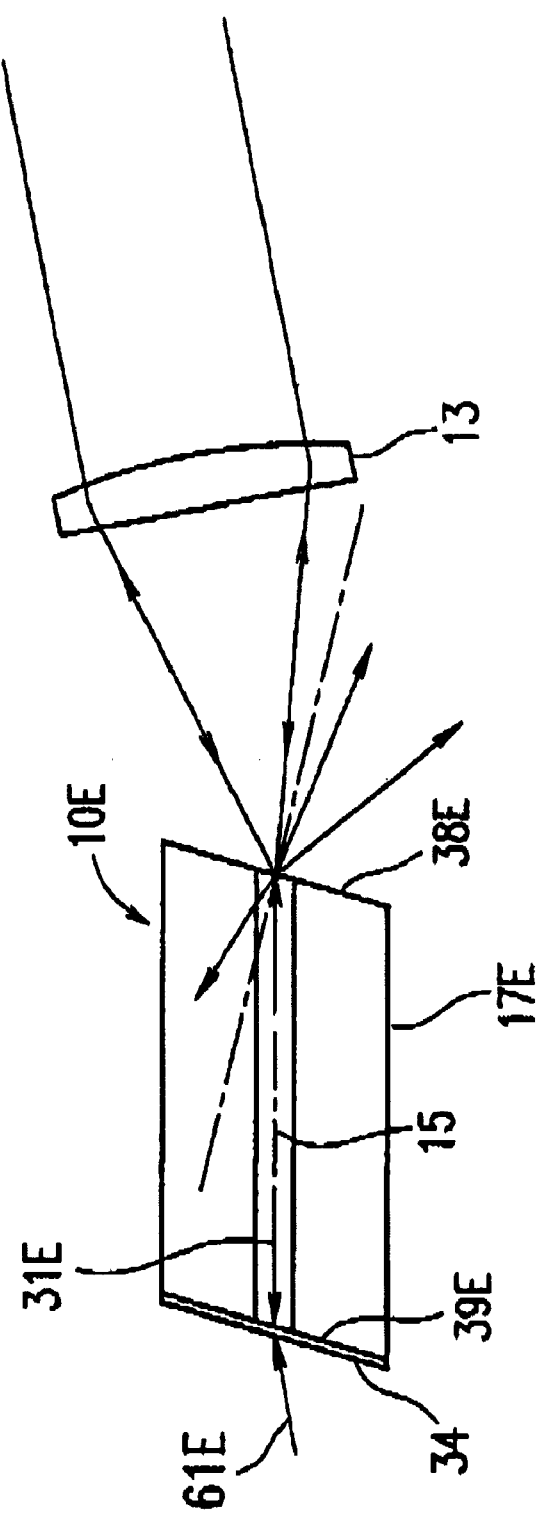
FIG. 9 is a partial schematic top view of a light source device in still another example according to the present invention.

FIG. 9 schematically shows an optical waveguide device 10E having an incident surface 39E and an outgoing surface 38E of an SHG element 17E. A fundamental wave 61E is incident on the incident surface 39E. The optical waveguide device 10E further includes a reflection reducing layer 34 disposed on the incident surface 39E. The reflection reducing layer 34 is provided for reducing a reflection of a returning harmonic wave 31E returning from the pickup optical system (only the collimator lens 13 is shown in FIG. 9). A usual SHG element is provided with a reflection reducing layer for reducing reflection of a fundamental wave by an incident surface thereof in order to prevent the fundamental wave from returning to a semiconductor laser (not shown). In the example shown in FIG. 9, reflection of the fundamental wave 61E does not need to be prevented since the incident surface 39E oblique with respect to an optical waveguide 15E prevents the light from returning to the semiconductor laser.

The reflection of the returning harmonic wave 31E returning from the pickup optical system (including the collimator lens 13) is not completely eliminated by the oblique incident surface 39E. The reflection reducing layer 34 provided on the incident surface 39E further reduces the reflection of the returning harmonic wave 31E.

The reflection reducing layer 34 can alternatively be disposed with a gap from the incident surface 39E.

Example 5

Figure 10:
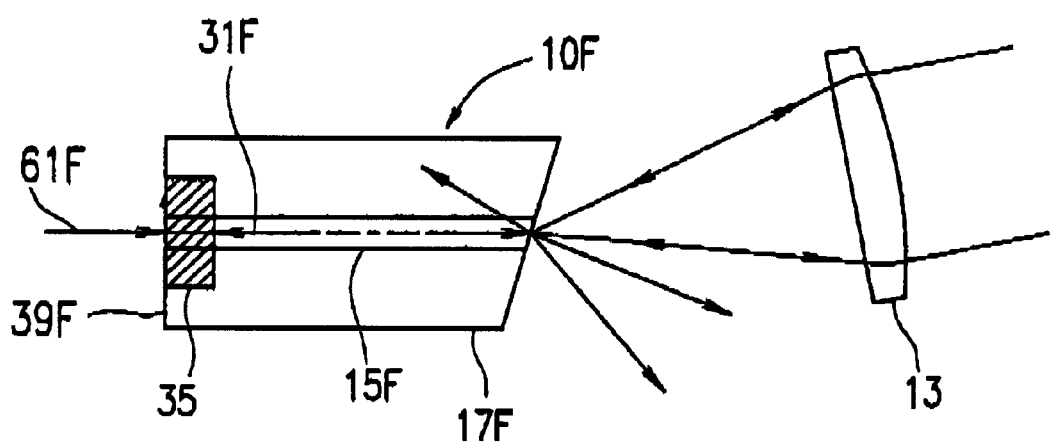
FIG. 10 is a partial schematic top view of a light source device in still another example according to the present invention.

FIG. 10 schematically shows an optical waveguide device 10F for reducing a returning harmonic wave 31F returning from the pickup optical system (only the collimator lens 13 is shown in FIG. 10) by a harmonic wave absorption element 35 included in the optical waveguide device 10F. The harmonic wave absorption element 35 is provided in a portion of the optical waveguide 15F in the vicinity of the incident surface 39F of an SHG element 17F of the optical waveguide device 10F.

When near infrared light having a wavelength of about 860 nm used as a fundamental wave 61F is converted into blue light having a wavelength of about 425 nm as a harmonic wave, the harmonic wave absorption element 35 can be formed of, for example, titanium oxide, zinc selenide, gallium phosphide, or amorphous silicon. These substances are transmissive with respect to light in the infrared region and have spectral characteristics absorbing blue light. These substances can also be formed on an optical waveguide 15F in the optical waveguide device 10F in the form of a thin film by sputtering or other technologies.

In a device using light of other wavelength ranges from above, for example, in a device in which red light as the fundamental wave is converted into ultraviolet light as the harmonic wave, other substances can be used as the harmonic wave absorption element 35.

Example 6

Figure 11:
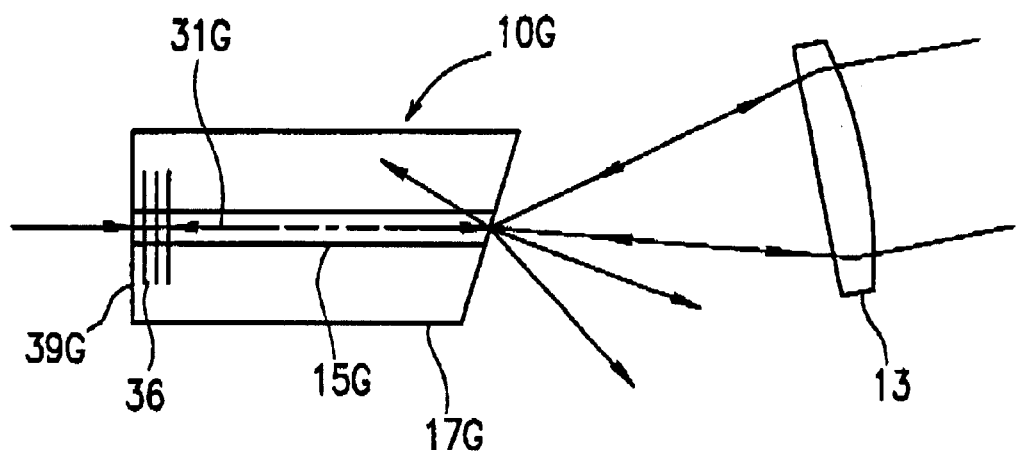
FIG. 11 is a partial schematic view of a light source device in still another example according to the present invention.

FIG. 11 schematically shows an optical waveguide device 10G for preventing the interference of a harmonic returning wave 31G returning from the pickup optical system (only the collimator lens 13 is shown in FIG. 11) and the outgoing light from an optical waveguide 15G by diffracting and scattering the harmonic returning wave 31G using a grating element 36 included in the optical waveguide device 10G.

As shown in FIG. 11, the grating element 36 having a short periodicity Λ is formed in a portion of an optical waveguide 15G in the vicinity of an incident surface 39G of an SHG element 17G. The periodicity Λ is set to a value fulfilling expression (5):

$$\lambda/(4\times n) < \Lambda < \lambda/(2\times n) \quad (5)$$

where λ is a wavelength of the fundamental wave in a vacuum and n is the effective refractive index of the optical waveguide 15G. By setting the periodicity Λ to such a value, the harmonic wave is diffracted and the fundamental wave is not diffracted.

Figure 12:
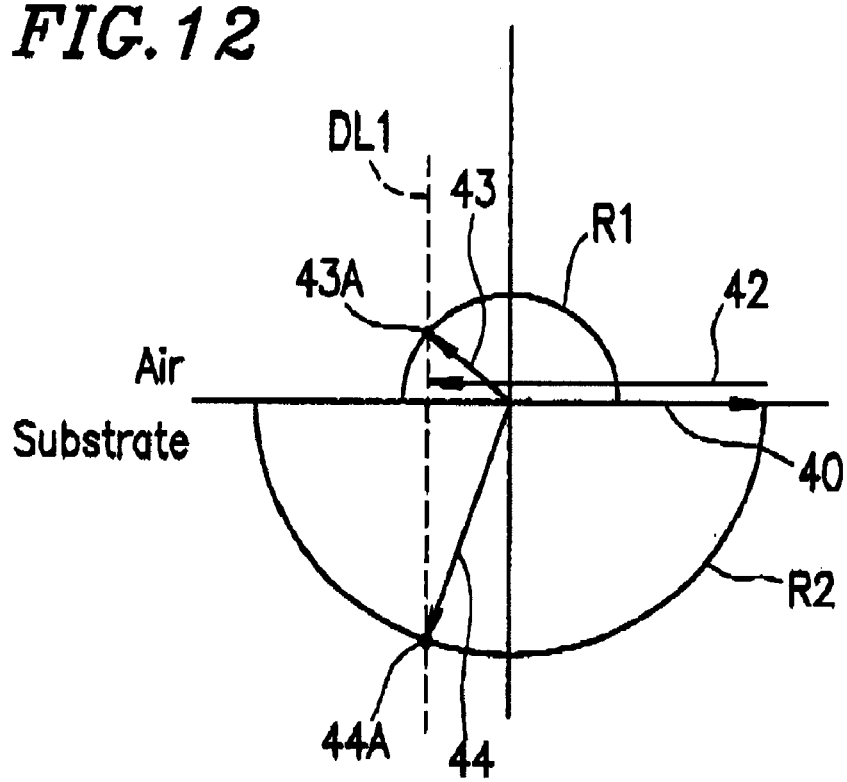
FIG. 12 is a vector diagram with respect to a harmonic wave obtained in the light source device shown in FIG. 11.
Figure 13:
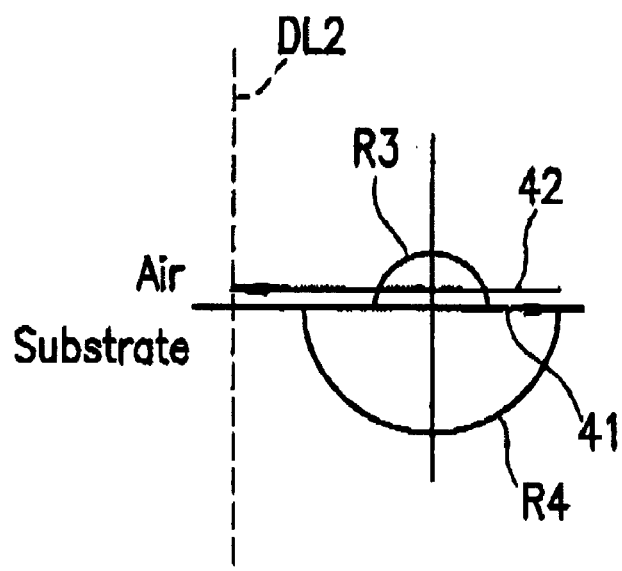
FIG. 13 is a vector diagram with respect to a fundamental wave obtained In the optical apparatus shown in FIG. 11.
Figure 14:
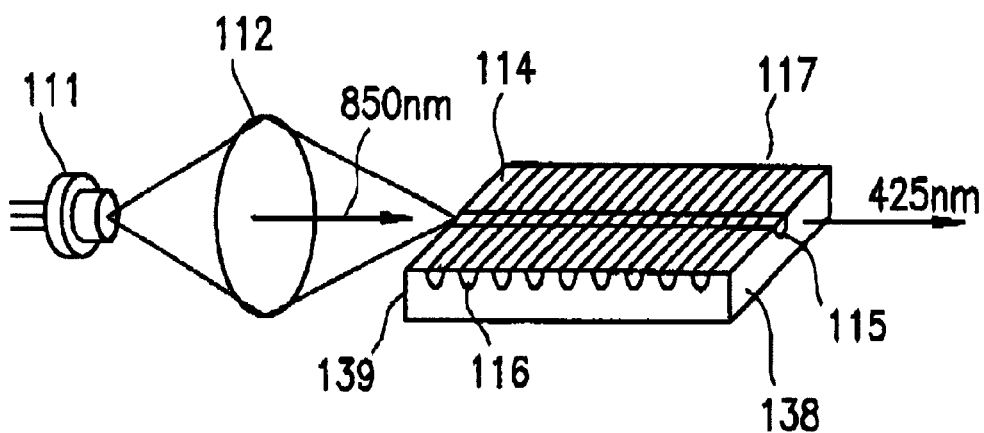
FIG. 14 is a partial schematic view of a conventional light source device.
Figure 15:
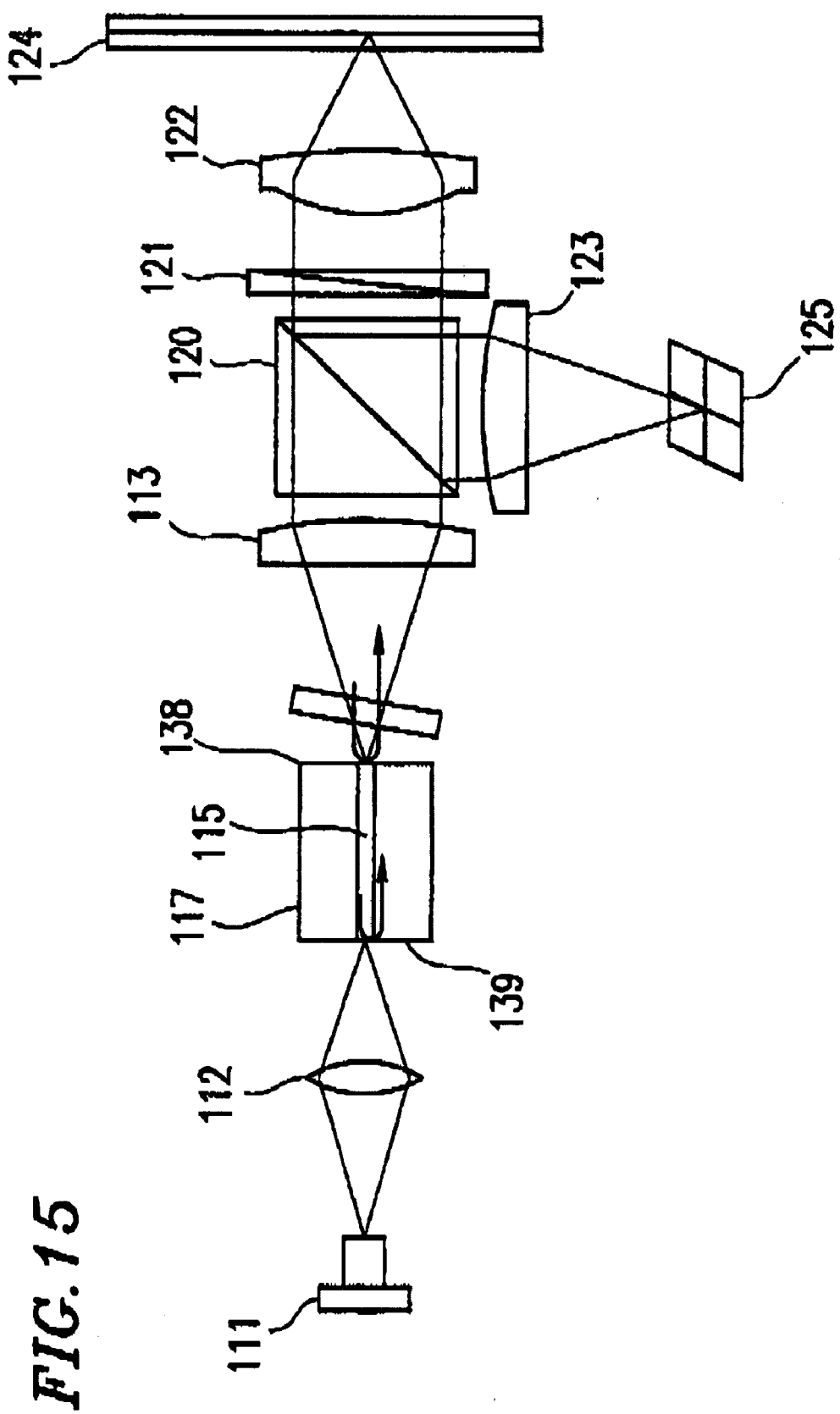
FIG. 15 is a schematic view of a conventional optical apparatus including the light source device shown in FIG. 14.

FIG. 12 is a vector diagram with respect to the harmonic wave, and FIG. 13 is a vector diagram with respect to the fundamental wave.

The vector diagram shown in FIG. 12 represents a wave number vector 40 of the harmonic guided wave, a wave number vector 42 of the grating element 36, a wave number vector 43 of light diffracted into air, and a wave number vector 44 of light diffracted into the dielectric substrate.

The vector diagram shown in FIG. 13 represents a wave number vector 41 of the fundamental guided wave and a wave number vector 42 of the grating element 36. The direction of each vector corresponds to the propagation direction, and the size of the vector corresponds to the wave number.

The direction of the diffracted light obtained by the grating element 36 is found by the vector diagram in the following manner. The wavelength of the light radiating in the air or the dielectric substrate is determined at a certain value. Accordingly, the wave number vectors of the radiating value (i.e., diffracted light to the air and the dielectric substrate) terminate on semicircles R1 and R2 in FIG. 12 and on semicircles R3 and R4 in FIG. 13.

A guided wave is diffracted into the dielectric substrate or air by the grating element 36 only when a horizontal component of the difference between the wave number vector of the radiating light and the wave number vector 40 or 41 of the guided wave matches the wave number vector 42 of the grating element 36. Accordingly, the wave number vectors of the radiating light terminate on dashed straight line DL1 In FIG. 12 and dashed straight line DL2 in FIG. 13.

In other words, when the harmonic guided wave is diffracted (FIG. 12), the radiating light is generated toward an intersection 43A of the semicircle R1 and the dashed straight line DL1 and an intersection 44A of the semicircle R2 and the dashed straight line DL1.

In FIG. 13, the dashed straight line DL2 does not intersect with the semicircle R3 or R4. Accordingly, the guided wave does not become radiating light and thus is propagated through the grading element 36 without loss.

The reflection of the returning light at the incident surface 39G of the optical waveguide device 10G (FIG. 11) can also be reduced by using the grating element 36 having a periodicity fulfilling expression (5).

In the above examples, an SHG element is used as the dielectric substrate in the optical waveguide device. An optical waveguide device according to the present invention is not limited to such a structure. Waveguide devices having various functions and structures, such as, for example, a high-speed modulation element, a phase shifter, a frequency shifter and a polarization control element are usable according to the present invention. An optical waveguide device according to the present invention is usable in any optical system using a coherent light source.

In the case where an optical waveguide device according to the present invention used in a light source device, the optical waveguide device is especially effective when including an SHG element for the following reason. When the SHG element is included in the optical waveguide device, the light source device often uses, as a light source, a semiconductor device having a high interference possibility to generate harmonic wave having a high interference possibility. As an interference noise is thus generated easily, the optical waveguide device according to the present invention is more effective.

In the above examples, an optical apparatus including a pickup optical system is used as the confocal optical system is described. The present invention is applicable to other coherent optical systems such as, for example, a laser scanning microscope or a laser printer.

An optical waveguide device according to the present invention is especially effective for an optical pickup including a pickup optical system. The reasons for this is that an optical disk from which the data is detected by the pickup optical system has a high reflectance, that an objective lens is positionally controlled so as to collect light to the optical disk to maintain a confocal optical system, and that an upward and downward movement of the optical disk causes the interference conditions to be changed continuously and thus the interference noise is easily generated.

As described above, an optical waveguide device according to the present invention has an outgoing surface formed oblique to an optical waveguide. Due to such a structure, light returning from an optical system external to the optical waveguide device such as, for example, a pickup optical system is reflected by the outgoing surface in such a manner to avoid interference of the reflected light and the outgoing light. Thus, a stable light source device with substantially no interference noise is provided.

In an embodiment where the incident surface is also oblique with respect to the optical waveguide, the light returning from the optical system external to the optical waveguide device is prevented from being reflected by the incident surface, and also light returning to a semiconductor laser is suppressed.

Various other modifications will be apparent to and can be readily made by those skilled In the art without departing from the scope and spirit of this invention. Accordingly, it is not intended that the scope of the claims appended hereto be limited to the description as set forth herein, but rather that the claims be broadly construed.

What is claimed is:

1. An optical waveguide device, comprising:
    a dielectric substrate;
    an optical waveguide formed in or on the dielectric substrate having an outgoing surface disposed at an angle other than a right angle relative to a direction of the optical waveguide at the outgoing surface; and
    a reflection reducing layer for reducing a reflection of a harmonic wave,
        wherein the reflection reducing layer is disposed on an incident surface of the optical waveguide.

2. An optical waveguide device according to claim 1, wherein the dielectric substrate has an outgoing surface disposed in a plane within which the outgoing surface of the optical waveguide is disposed.

3. An optical waveguide device according to claim 1, wherein the outgoing surface is angled so that light going out from the optical waveguide in a first direction and reflected back to the outgoing surface by an external object is directed by the outgoing surface in a second direction different from the first direction.

4. An optical waveguide device according to claim 1, wherein the optical waveguide has an incident surface disposed at an angle other than a right angle relative to a direction of the optical waveguide at the incident surface.

5. An optical waveguide device according to claim 4, wherein the dielectric substrate has an incident surface disposed in a plane within which the incident surface of the optical waveguide is disposed.

6. An optical waveguide device according to claim 5, wherein the dielectric substrate has an outgoing surface disposed in a plane within which the outgoing surface of the optical waveguide is disposed, and the incident surface of the dielectric substrate and the optical waveguide is substantially parallel to the outgoing surface of the dielectric substrate and the optical waveguide.

7. An optical waveguide device according to claim 1, further comprising a harmonic wave absorption element for absorbing a harmonic wave in a portion of the optical waveguide in the vicinity of the incident surface.

8. A light source device, comprising:
    an optical waveguide device according to claim 1, and
    a collimator lens for substantially collimating outgoing light from the optical waveguide,
        wherein the collimator lens is located at a center of distribution of the outgoing light from the optical waveguide.

9. An optical waveguide device according to claim 1, wherein the dielectric substrate and the optical waveguide form a second harmonic generation element.

10. An optical waveguide device according to claim 9, further comprising a grating element having a periodicity of $\Lambda$ in a portion of the optical waveguide in the vicinity of the incident surface:
    wherein the second harmonic generation element receives light having a wavelength of $\lambda$ as a fundamental wave in a vacuum; and the periodicity $\Lambda$, an effective refractive index n of the optical waveguide, and the wavelength $\lambda$ fulfill the relationship of $\lambda/(4 \times n) < \Lambda < \lambda/(2 \times n)$.

11. An optical waveguide device, comprising:
    a dielectric substrate;
    an optical waveguide formed in or on the dielectric substrate having an outgoing surface disposed at an angle other than a right angle relative to a direction of the optical waveguide at the outgoing surface; and
    a harmonic wave absorption element for absorbing a harmonic wave in a portion of the optical waveguide in the vicinity of an incident surface of the optical waveguide.

12. An optical waveguide device according to claim 11, wherein the dielectric substrate has an outgoing surface disposed in a plane within which the outgoing surface of the optical waveguide is disposed.

13. An optical waveguide device according to claim 11, wherein the outgoing surface is angled so that light going out from the optical waveguide in a first direction and reflected back to the outgoing surface by an external object is directed by the outgoing surface in a second direction different from the first direction.

14. An optical waveguide device according to claim 11, wherein the optical waveguide has an incident surface disposed at an angle other than a right angle relative to a direction of the optical waveguide at the incident surface.

15. An optical waveguide device according to claim 14, wherein the dielectric substrate has an incident surface disposed in a plane within which the incident surface of the optical waveguide is disposed.

16. An optical waveguide device according to claim 15, wherein the dielectric substrate has an outgoing surface disposed in a plane within which the outgoing surface of the optical waveguide is disposed, and the incident surface of the dielectric substrate and the optical waveguide is substantially parallel to the outgoing surface of the dielectric substrate and the optical waveguide.

17. An optical waveguide device according to claim 11, wherein the dielectric substrate and the optical waveguide form a second harmonic generation element.

18. An optical waveguide device according to claim 11, further comprising a reflection reducing layer for reducing a reflection of a harmonic wave.

19. An optical waveguide device according to claim 18, wherein the reflection reducing layer is disposed on the incident surface.

20. An optical waveguide device according to claim 17, further comprising a grating element having a periodicity of $\Lambda$ in a portion of the optical waveguide in the vicinity of the incident surface;
    wherein the second harmonic generation element receives light having a wavelength of $\lambda$ as a fundamental wave in a vacuum; and the periodicity $\Lambda$, an effective refractive index n of the optical waveguide, and the waveguide $\lambda$ fulfill the relationship of $\lambda/(4 \times n) < \Lambda < \lambda/(2 \times n)$.

21. A light source device, comprising:
    an optical waveguide device according to claim 11, and
    a collimator lens for substantially collimating outgoing light from the optical waveguide, wherein the collimator lens is located at a center of distribution of the outgoing light from the optical waveguide.

22. An optical waveguide device, comprising:

a dielectric substrate;

an optical waveguide formed in or on the dielectric substrate having an outgoing surface disposed at an angle other than a right angle relative to a direction of the optical waveguide at the outgoing surface; and a grating element having a periodicity of $\Lambda$ in a portion of the optical waveguide in the vicinity of an incident surface of the optical waveguide, wherein the dielectric substrate and the optical waveguide form a second harmonic generation element;

second harmonic generation element receives light having a wavelength of $\lambda$ as a fundamental wave in a vacuum; and the periodicity $\Lambda$, an effective refractive index n of the optical waveguide, and the wavelength $\lambda$ fulfill the relationship of $\lambda/(4 \times n) < \Lambda < \lambda/(2 \times n)$.

23. An optical waveguide device according to claim 22, wherein the dielectric substrate has an outgoing surface disposed in a plane within which the outgoing surface of the optical waveguide is disposed.

24. An optical waveguide device according to claim 22, wherein the outgoing surface is angled so that light going out from the optical waveguide in a first direction and reflected back to the outgoing surface by an external object is directed by the outgoing surface in a second direction different from the first direction.

25. An optical waveguide device according to claim 22, wherein the optical waveguide has an incident surface disposed at an angle other than a right angle relative to a direction of the optical waveguide at the incident surface.

26. An optical waveguide device according to claim 25, wherein the dielectric substrate has an incident surface disposed in a plane within which the incident surface of the optical waveguide is disposed.

27. An optical waveguide device according to claim 26, wherein the dielectric substrate has an outgoing surface disposed in a plane within which the outgoing surface of the optical waveguide is disposed, and the incident surface of the dielectric substrate and the optical waveguide is substantially parallel to the outgoing surface of the dielectric substrate and the optical waveguide.

28. An optical waveguide device according to claim 22, further comprising a reflection reducing layer for reducing a reflection of a harmonic wave.

29. An optical waveguide device according to claim 28, wherein the reflection reducing layer is disposed on the incident surface.

30. An optical waveguide device according to claim 22, further comprising a harmonic wave absorption element for absorbing a harmonic wave in a portion of the optical waveguide in the vicinity of the incident surface.

31. A light source device, comprising:

an optical waveguide device according to claim 22, and a collimator lens for substantially collimating outgoing light from the optical waveguide, wherein the collimator lens is located at a center of distribution of the outgoing light from the optical waveguide.

* * * * *